United States Patent
Goldberg et al.

(10) Patent No.: US 7,656,559 B2
(45) Date of Patent: Feb. 2, 2010

(54) SYSTEM AND METHOD FOR GENERATING A SIGNED HARDCOPY DOCUMENT AND AUTHENTICATION THEREOF

(75) Inventors: David Goldberg, Palo Alto, CA (US); William J. Rucklidge, Mountain View, CA (US); James D. Thornton, Redwood City, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/165,458

(22) Filed: Jun. 30, 2008

(65) Prior Publication Data

US 2008/0260267 A1    Oct. 23, 2008

Related U.S. Application Data

(63) Continuation of application No. 09/346,559, filed on Jun. 30, 1999, now Pat. No. 7,394,573.

(60) Provisional application No. 60/129,304, filed on Apr. 14, 1999.

(51) Int. Cl.
    H04N 1/40     (2006.01)
    H04N 1/405    (2006.01)
    B41C 1/02     (2006.01)
    B41C 1/04     (2006.01)
    G06K 9/36     (2006.01)

(52) U.S. Cl. .................. 358/3.28; 358/3.3; 382/232

(58) Field of Classification Search ............ 358/1.15, 358/1.9, 3.28, 405, 426.02, 3.01, 3.06, 3.21, 358/3.24, 3.3, 3.31; 382/166, 235, 250, 137, 382/139, 140, 232, 233
See application file for complete search history.

(56) References Cited

U.S. PATENT DOCUMENTS

| | | |
|---|---|---|
| 5,091,966 A | 2/1992 | Bloomberg et al. |
| 5,128,525 A | 7/1992 | Stearns et al. |
| 5,157,726 A | 10/1992 | Merkle et al. |
| 5,168,147 A | 12/1992 | Bloomberg et al. |
| 5,221,833 A | 6/1993 | Hecht |
| 5,245,165 A | 9/1993 | Zhang |
| 5,293,430 A | 3/1994 | Shiau et al. |
| 5,315,098 A | 5/1994 | Tow |
| 5,321,751 A | 6/1994 | Ray et al. |
| 5,449,895 A | 9/1995 | Hecht et al. |
| 5,486,686 A | 1/1996 | Zdybel et al. |

(Continued)

OTHER PUBLICATIONS

Bhattacharjee et al., "Compression Tolerant Image Authentication," IEEE Signal Processing Society 1998 International Conference on Image Processing, Oct. 4-7, 1998, Chicago, Illinois.

(Continued)

*Primary Examiner*—James A Thompson
(74) *Attorney, Agent, or Firm*—Patrick J. S. Inouye; Krista A. Wittman

(57) ABSTRACT

A system and method for generating a signed hardcopy document and authentication thereof is provided. A data representation including digital data is recorded from a hardcopy document. The digital data is compressed using a compression scheme including one of low-fidelity compression and symbol-based compression. An authentication token is generated from the compressed digital data. The authentication token is encoded. A signed hardcopy document including both the encoded authentication token and the data representation is printed.

22 Claims, 8 Drawing Sheets

U.S. PATENT DOCUMENTS

| | | | |
|---|---|---|---|
| 5,499,294 | A | 3/1996 | Friedman |
| 5,706,099 | A | 1/1998 | Curry |
| 5,835,638 | A | 11/1998 | Rucklidge et al. |
| 5,898,779 | A * | 4/1999 | Squilla et al. ............... 713/176 |
| 5,912,974 | A | 6/1999 | Holloway |
| 5,923,406 | A * | 7/1999 | Brasington et al. ............ 355/40 |
| 5,946,103 | A * | 8/1999 | Curry ........................ 358/3.28 |
| 6,081,345 | A | 6/2000 | Curry |
| 6,111,953 | A | 8/2000 | Walker et al. |
| 6,577,336 | B2 | 6/2003 | Safai |
| 6,601,172 | B1 * | 7/2003 | Epstein ....................... 713/178 |
| 6,611,598 | B1 | 8/2003 | Hayosh |
| 2002/0191090 | A1 * | 12/2002 | Safai .......................... 348/239 |

OTHER PUBLICATIONS

"Digital Signature Standard (DSS)," http://www.itl.nist.gov/div897/pubs/fip186.htm, Federal Information Processing Standards Publication 186, May 19, 1994.

Lin, Ching-Yung et al., "Generating Robust Digital Signature For Image/Video Authentication," Multimedia and Security Workshop at ACM Multimedia '98, Bristol, United Kingdom, Sep. 1998.

Lin, Ching-Yung et al., "Issues and Solutions For Authenticating MPEG Video," Proceedings of SPIE Security and Watermarking of Multimedia Contents, EI '99, San Jose, California, Jan. 25-27, 1999, vol. 3657.

Lin, Ching-Yung et al., "A Robust Image Authentication Method Distinguishing JPEG Compression From Malicious Manipulation," CU/CTR Technical Report 486-97-19, Dec. 1997, Columbia University; also submitted to IEEE Transactions on Circuits and Systems for Video Technology.

O'Gorman, Lawrence et al., "Secure Identification Documents Via Pattern Recognition and Public-Key Cryptography," IEEE Transactions on Pattern Analysis and Machine Intelligence, vol. 20, No. 10, Oct. 1998, pp. 1097-1102.

"Secure Hash Standard," http://www.itl.nist.gov/div897/pubs/fip180-1.htm. Federal Information Processing Standards Publication 180-1, Apr. 17, 1995.

Joint Photographic Experts Group (JPGEG) http://www.jpeg.org.

Jerome M. Shapiro, "Embedded Image Coding Using Zerotrees of Wavelet Coefficients", IEEE Transactions on Signal Processing, vol. 41, No. 12, Dec. 1993, pp. 3445-3462.

Said et al., "A New, Fast, and Efficient Image Codec Based on Set Partitioning in Hierarchical Trees", IEEE Transactions on Circuits and Systems for Video Technology, vol. 6, No. 3, Jun. 1996, pp. 243-250.

* cited by examiner

SYSTEM AND METHOD FOR GENERATING A SIGNED HARDCOPY DOCUMENT AND AUTHENTICATION THEREOF

CROSS-REFERENCE TO RELATED APPLICATION

This patent application is a continuation of U.S. patent application, Ser. No. 09/346,559, filed Jun. 30, 1999, now U.S. Pat. No. 7,394,573, issued on Jul. 1, 2008, which claims priority from U.S. Provisional Patent Application, Ser. No. 60/129,304, filed Apr. 14, 1999, expired, the priority filing dates of which are claimed, and the disclosures of which are incorporated by reference.

FIELD

The present invention relates generally to using electronic methods to process hardcopy documents, and more particularly, to a system that uses digital methods for authenticating hardcopy documents.

BACKGROUND

The use of public-key cryptography to authenticate (i.e., verify the integrity of) digital data by a recipient is well known. For example, the Digital Signature Standard (DSS), a proposed Federal Information Processing Standard (FIPS), provides a Digital Signature Algorithm (DSA) for digital signature generation and verification. (Details of the DSA are available on the Internet at http://www.itl.nist.gov/div897/pubs/fip186.htm (FIS PUB 186), which is hereby incorporated by reference.) Typically, the DSA and other forms of digital signatures make use of public and private keys. Public keys are assumed to be known to the public whereas private keys are never shared between users. Digital signatures are generated using private keys and verified using a corresponding public key to authenticate, or verify the integrity of, a digital document.

Public-key cryptography has proven to function well for applications that can assure that the sender and the recipient have identical (i.e., digitally identical) message data. In operation, such digital signature algorithms utilize a secure hash function to generate a condensed version of digital message data. In practice, making the hash function one-way or irreversible maximizes the security of a hash function. Once condensed, the message data is signed using the sender's secret key to generate a digital signature. Upon receipt of the digital signature and the digital message data, the recipient utilizes the same hash function to regenerate the condensed version of the message data. This condensed version of the message data is then verified using the signature and the sender's public key.

However, once message data between the sender and recipient is no longer digitally identical then public-key cryptography is no longer practical for providing the verification of digital signatures. In one instance, message data passed between sender and recipient may fail to be digitally identical when the data being passed is analog data. Analog data is defined herein as data that may not have reduced quality when reproduced at the recipient and the sender, however, the digital reproductions may not be identical. In general, applications that pass between sender and recipient message data that is not digitally identical are not well suited for public-key cryptography.

Another instance where public-key cryptography fails to operate as intended is when a document needs to be further processed after the digital signature is computed. For example, further processing of a document may require conversion to a different resolution, or further lossy compression. If the resolution conversion or lossy compression applied to a document is non-reversible, then the signature will not apply to the processed image because the further processing makes the original document and the further processed document no longer digitally identical.

A further instance where public-key cryptography fails to operate as intended is for the digital signature verification of hardcopy documents (e.g., paper, and transparency). In this instance, scanned reproductions of the sender hardcopy document and the recipient hardcopy document are not digitally identical because document scanners have the property of being unable to reproduce a digital scan of a hardcopy document even if the same scanner is used repeatedly.

In view of forgoing limitations of public-key cryptography, it would be desirable to provide a system that can be used to authenticate (i.e., verify the integrity of) hardcopy documents. Such a system would advantageously be used to detect changes between a hardcopy document delivered by a sender to a recipient without requiring repeatable digital reproductions of the hardcopy document.

SUMMARY

In accordance with the invention, there is provided a method and apparatus therefore, for authenticating a hardcopy document. Initially, a scanned representation of the hardcopy document is recorded in a memory at a selected resolution. Lossy compressed image data is generated with the scanned representation of the hardcopy document. An authentication token is produced with the lossy compressed image data. The authentication token includes encrypted image data or hashed encrypted image data. The hashed encrypted image data includes the lossy compressed image data and an encrypted hash of the lossy compressed image data. The scanned representation of the hardcopy document is arranged in the memory with a digital encoding of the authentication data for rendering at a printer a signed hardcopy document.

In accordance with one aspect of the invention, the authenticity of the signed hardcopy document is verified by initially recording a scanned representation of the signed hardcopy document. The authentication token is decoded from the scanned representation of the signed hardcopy document. The lossy compressed image data is authenticated using either the encrypted image data or the hashed encrypted image data. The authenticated lossy compressed image data is decompressed for comparison with the signed hardcopy document to determine whether the signed hardcopy document is authentic.

In accordance with another aspect of the invention, different types of image data (e.g., text, halftone) and/or different regions are identified and compressed using different compression schemes. This aspect of the invention may be used to improve image compression by compressing certain identified image content with data dependent compression schemes. In addition, this aspect of the invention may be used to enhance verification of the signed hardcopy document by compressing image content that is more important at lower compression ratios.

In accordance with another aspect of the invention, the lossy compressed image data is compressed using a low-fidelity token-based compression scheme. This aspect of the invention is performed by recording the exemplars and locations of exemplars at resolutions that are less than the selected resolution of the scanned representation of the hardcopy document.

In accordance with another aspect of the invention, a system and method for generating a signed hardcopy document and authentication thereof is provided. A data representation including digital data is recorded from a hardcopy document. The digital data is compressed using a compression scheme including one of low-fidelity compression and symbol-based compression. An authentication token is generated from the compressed digital data. The authentication token is encoded. A signed hardcopy document including both the encoded authentication token and the data representation is printed.

In accordance with yet another aspect of the invention, a system and method for generating a notary stamp and authentication thereof is provided. A data representation including digital data is recorded from a hardcopy document. The digital data is compressed using a compression scheme including one of low-fidelity compression and symbol-based compression. An authentication token is generated from the compressed digital data. The authentication token is encoded. The encoded authentication token is rendered as a notary stamp. The notary stamp is printed on an adhesive label attachable to the hardcopy document as a signed hardcopy document.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Overview

Figure 1:
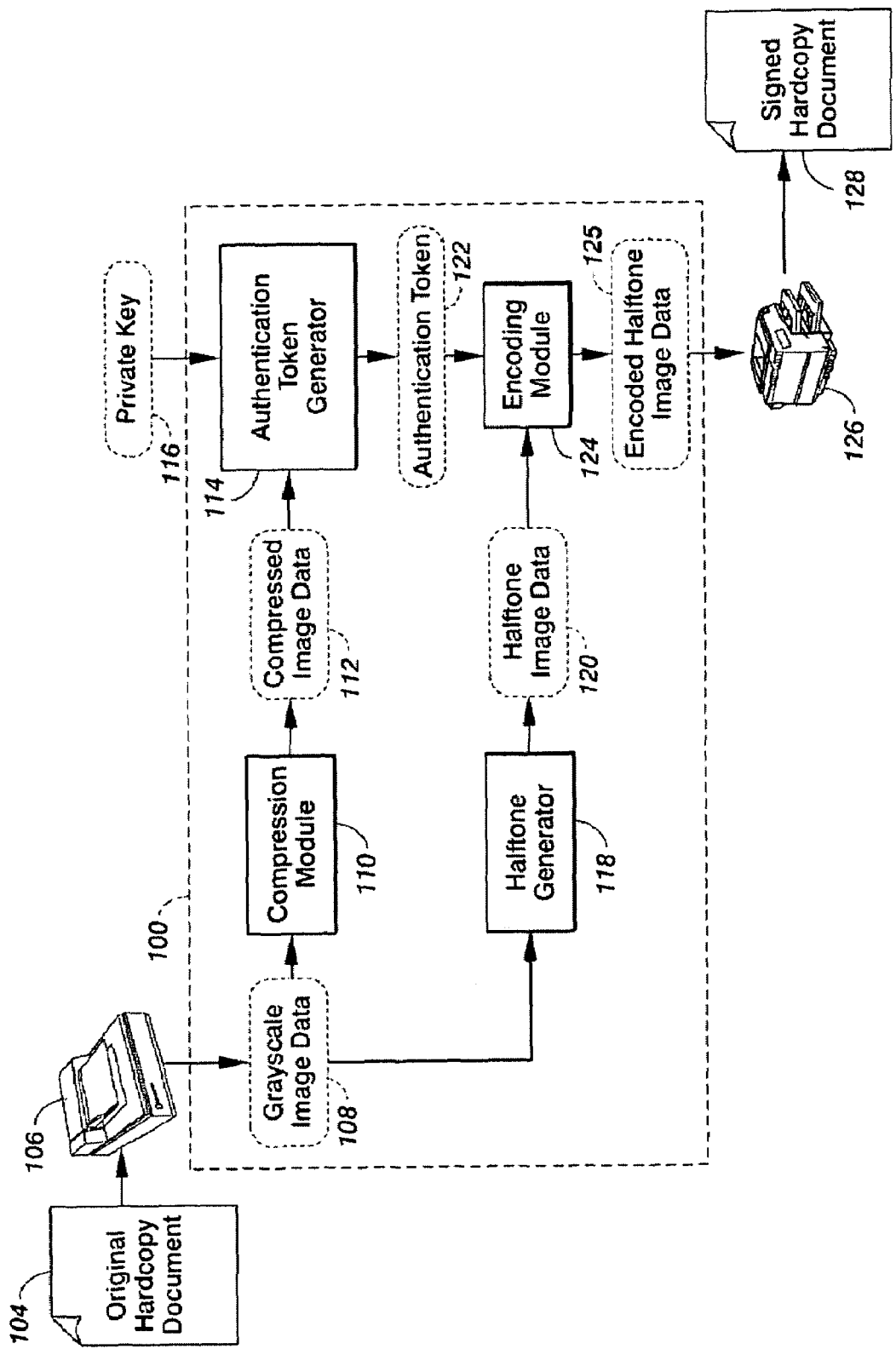
FIG. 1 illustrates a signature generation system for generating a signed hardcopy document of an original document.
Figure 5:
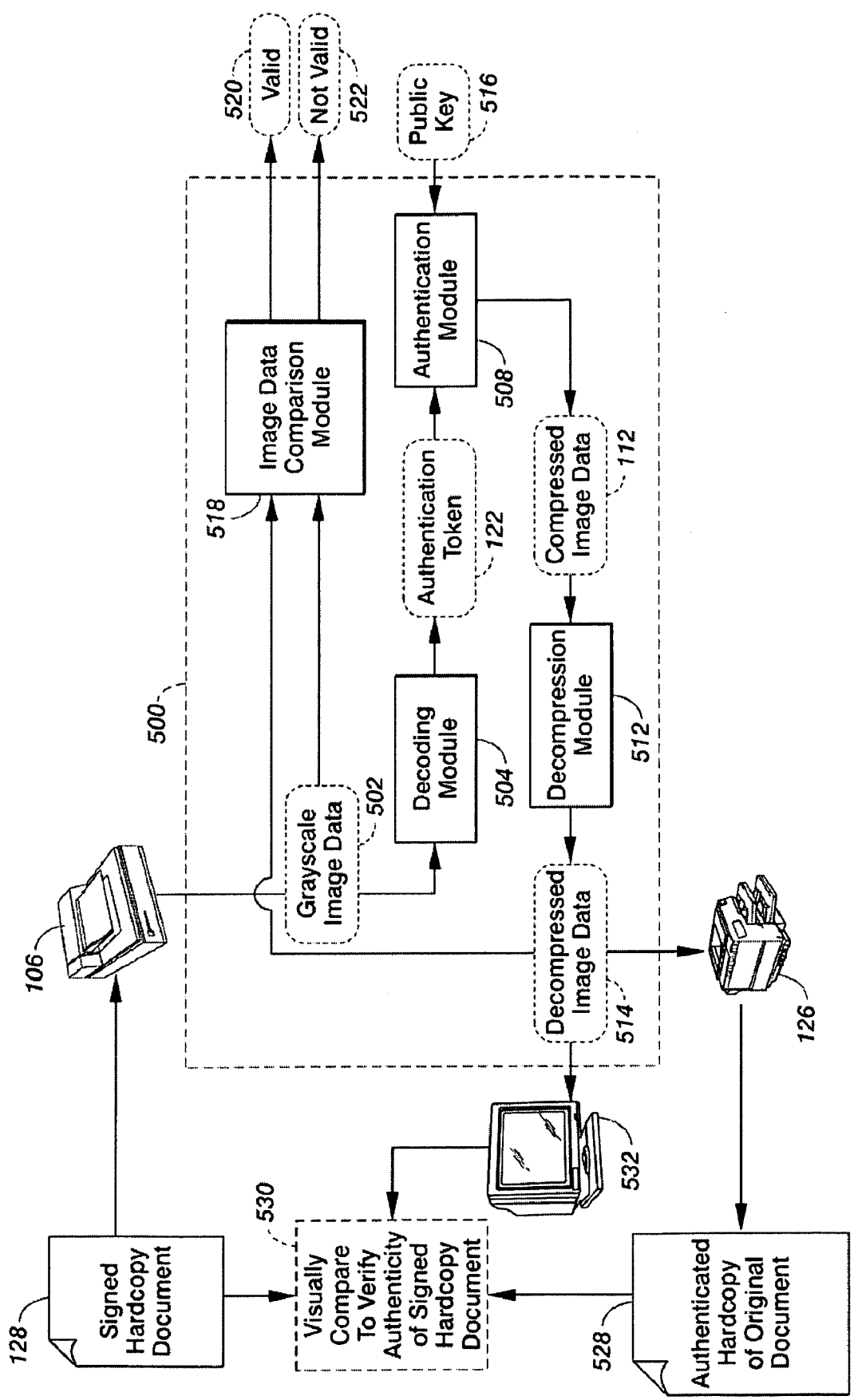
FIG. 5 illustrates a signature verification system for verifying a signed hardcopy document.
Figure 6:
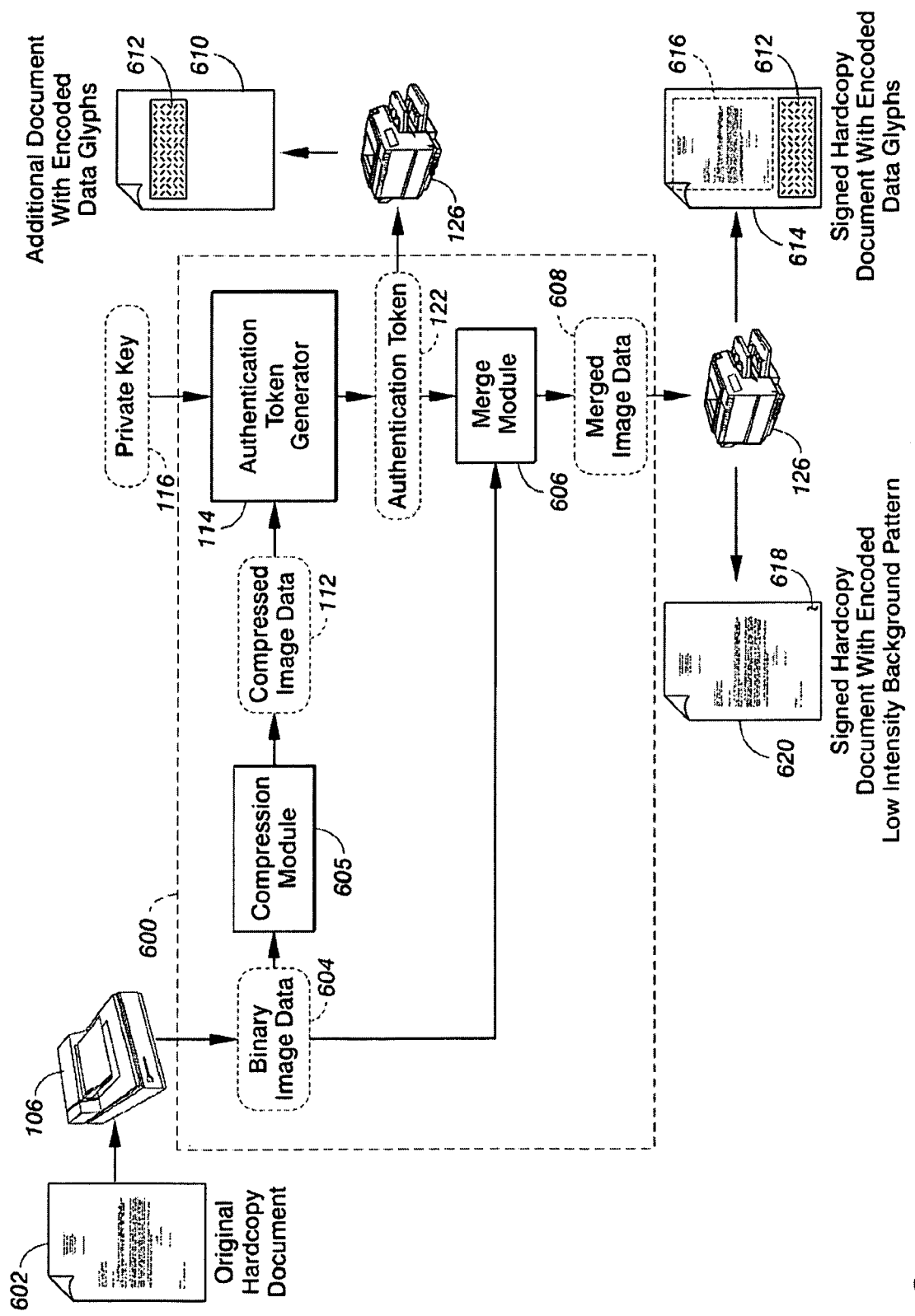
FIG. 6 illustrates an alternate embodiment for generating a signed hardcopy document of an original document composed of textual (i.e., bi-level) content.

The present invention relates to the authentication of hardcopy documents using digital imaging systems and methods. Generally, authentication consists of two separate systems that perform two independent operations: a signature generation operation and a signature verification operation. That is, a sender of message data generates a signature and a recipient of message data verifies the signature. Different embodiments of the signature generation system are illustrated in FIGS. 1 and 6, and different embodiments of signature verification system are illustrated in FIG. 5. More specifically, FIG. 1 illustrates a signature generation system 100 for generating a signed hardcopy document 128 in accordance with the present invention. The signed hardcopy document 128 is prepared by inputting a scanned version of an original hardcopy document 104 into the signature generation system 100.

Upon receipt of the hardcopy document 128 that contains both the compressed content of the original hardcopy document and a digital signature (i.e., authentication token 122), the recipient determines the authenticity of the signed hardcopy document 128 by verifying the sender's signature using the signature verification system 500 set forth in FIG. 5.

In general, the signature generation system 100 and the signature verification system 500 operate on a conventional computer having one or more processor units for executing instructions. In addition, the conventional computer includes a memory for storing image data (e.g., grayscale image data) and instructions for performing the signing and/or verification of hardcopy documents in accordance with the present invention. More specifically, the instructions stored in the memory of the signature generation system 100 include a compression module 110, an authentication token generator 114, a halftone generator 118, and an encoding module 124, and the instructions stored in the memory of the signature verification system 500 include a decoding module 504, an authentication module 508, a decompression module 512, and an image data comparison module 518.

To summarize, the authentication of a hardcopy document generally requires two processes: a sender-based process for generating the signature for the hardcopy document (e.g., FIG. 1), and a recipient-based process for verifying the signature of the hardcopy document (e.g., FIG. 5). However, it will be appreciated by those skilled in the art that although the Figures show the signature generation system and the signature verification system to be independent systems, these two systems can be integrated together to form an authentication system that performs both signature generation and signature verification.

Signature Generation

Referring now specifically to the signature generation system 100 shown in FIG. 1, generating a signed hardcopy document 128 of an original hardcopy document 104 begins by recording a scanned bitmap image 108 with a scanner 106. In the embodiment illustrated in FIG. 1, the scanned bitmap image 108 is recorded by the scanner 106 as grayscale image data for recording both color and/or gray scale images. It will be appreciated by those skilled in the art that the number of grayscale levels is dependent upon the particular data being scanned and the particular processing and memory capabilities of the signature generation system 100. In the alternate embodiment shown in FIG. 6, the scanned bitmap image could be thresholded and recorded as binary image data.

In operation, the signature generation system 100 receives as input the grayscale image data 108 from scanner 106. Upon receipt of the image data 108, a compression module 110 generates compressed image data 112. In a preferred embodiment, the compressed image data 112 is compressed using a compression scheme that achieves highly compressed images with for example compression ratios of approximate 30:1 (i.e., uncompressed to compressed). Lossy compression schemes that achieve such compression ratios are known in the art, examples of which include JPEG (Joint Photographic Experts Group) and wavelets. Details of the JPEG encoding standard are available on the Internet at http://www.jpeg.org. Further details of wavelets is disclosed by Shapiro in "Embedded Image Coding Using Zerotrees of Wavelet Coefficients", IEEE Transactions on Signal Processing, Vol. 41, No. 12, December 1993, pp. 3445-3462, and by Said et al. in "A New, Fast, and Efficient Image Codec Based on Set Partitioning in Hierarchical Trees", IEEE Transactions on Circuits and Systems for Video Technology, Vol. 6, No. 3, June 1996, pp. 243-250. In an alternate embodiment, the compressed image data is compressed using lossless compression schemes that achieve a lower compression ratio than the aforementioned lossy compression schemes.

In addition, upon receiving the grayscale image data from scanner 106, the halftone generator 118 produces halftone image data 120. The method of producing halftone image data 120 from grayscale image data using the halftone generator 118 is well known in the art. The purpose of digital halftoning is to convert a large number of levels of gray and/or color in the image data 108 (e.g., 256 levels for black and white) to a lesser number of levels for output on printer 126. The halftone generator 118 effectively transforms the grayscale image data from grayscale input to halftone patterns that are two-dimensional arrays of pixels.

After receiving the compressed image data 112, the authentication token generator 114 produces an authentication token 122. The authentication token 122 represents a digital signature that is to be integrated with the grayscale image data 108 in the signed hardcopy document 128. The authentication token includes a compressed representation of the original hardcopy document and means for authenticating it. In operation, the authentication token generator 114 uses a private key 116 of the sender (i.e., author, owner) to sign the original hardcopy document 104. The private key (i.e., secret key) 116 is issued by a public-private key authority (not shown) that is commonly available on networks such as the Internet.

The authentication token generator 114 produces the authentication token 122 by either encrypting the compressed image data 112 (i.e., encrypted image data) or by encrypting a hash of the compressed image data 112. When a hash of the compressed image data 112 is encrypted, the authentication token 122 includes both the encrypted hash of the compressed image data and the compressed image data 112 (i.e., hashed encrypted image data). Encrypting image data can be performed using, for example, the RSA (Rivest, Shamir, and Adleman) algorithm. Other known encryption algorithms are disclosed in "Applied Cryptography: Protocols, Algorithms, and Source Code in C," by Bruce Schneier, 2nd edition (December 1995) John Wiley & Sons (ISBN: 04711117099), which is hereby incorporated by reference. Encrypting a hash of compressed image data can be performed, for example, using the DSA (referenced above). Generating a hash of data using a hash function is well known. An example of a hash function is the Secure Hash Standard (SHA) disclosed on the Internet at http://www.itl.nist.gov/div897/pubs/fip180-1.htm (FIS PUB 180-1), which is hereby incorporated by reference.

Upon receipt of the authentication token 122 and the halftone image data 120, the encoding module 124 produces encoded halftone image data 125, which is used by printer 126 to render the signed hardcopy document 128. In accordance with the invention, the authentication token 122 is encoded using embedded data. Embedded data is digital data carried by a document that is machine readable only. In one representation of embedded data, a halftone pattern such as a serpentine halftone pattern is used to encode the authentication token 122 as digital data in the halftone pattern. Forming part of the encoding module 124 is a pattern rotator that rotates a halftone cell depending on the particular value of the digital encoding required for the halftone cell. Once properly rotated, the output of the encoding module 124 is the encoded halftone image data 125 that is printed by printer 126 to form the signed hardcopy document 128.

It will be appreciated by those skilled in the art that the compression ratio of 30:1 set forth above is an estimate of the level of compression desired by the compression module 605. Whether a 30:1 compression ratio is achieved by the compression module 605 depends on a number of factors, one of which is the content of the original hardcopy document. For example, an original hardcopy document which has large all black and all white regions has less area that can be used to encode data using serpentine halftone patterns, and therefore requires a higher compression ratio than an original image with greater usable space for data encoding. The compression ratio achieved also depends on the density of serpentine halftone patterns used. It will further be appreciated by those skilled in the art that the compression ratio for original hardcopy documents will vary in a similar way for the alternate embodiments illustrated in FIG. 6.

Figure 2:
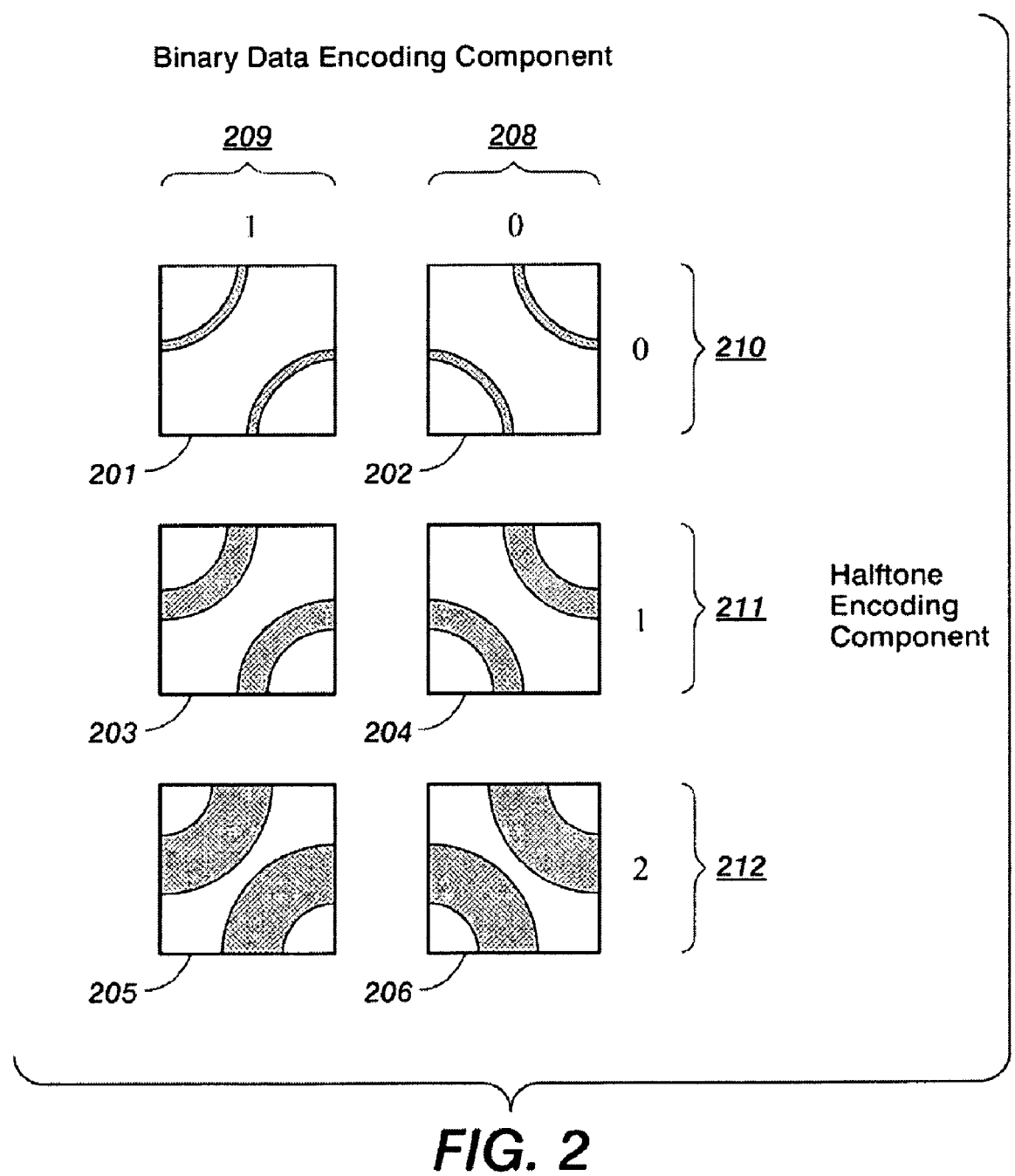
FIG. 2 illustrates serpentine halftone patterns for encoding data with a halftone component and a binary data component.

FIG. 2 illustrates an example a serpentine halftone pattern (i.e., a serpentone pattern) that can be used by the halftone generator 118 to produce the halftone image data 120 and by the encoding module 124 to encode the authentication token 122 in the halftone image data 120. More specifically, each square 201-206 represents a halftone cell that is a two-dimensional array of pixels. These halftone cells are formed from a serpentine pattern comprising two separate arcs. Each of the two arcs within each halftone cell intersects two adjacent sides of the halftone cell at approximately the center of a side of the halftone cell.

The tone of the image (i.e., grayscale image data) is controlled by selectively varying the thickness of the two separate arcs in each halftone cell. The rows 210-212 of halftone cells illustrate three levels of tone encoding. It will be appreciated by those skilled in the art that the number of tone levels for a particular halftone pattern will vary depending on the complexity of the original hardcopy document and the particular capabilities of the printer 126. In contrast, the rows 208 and 209 illustrate an encoding for two binary data components ("0" and "1"), which are used to encode the authentication token 122 in a digital form in the halftone pattern. Because the rotation of the halftone cells 201-206 does not vary the tone of the image, digital data can be encoded therein.

Figure 3:
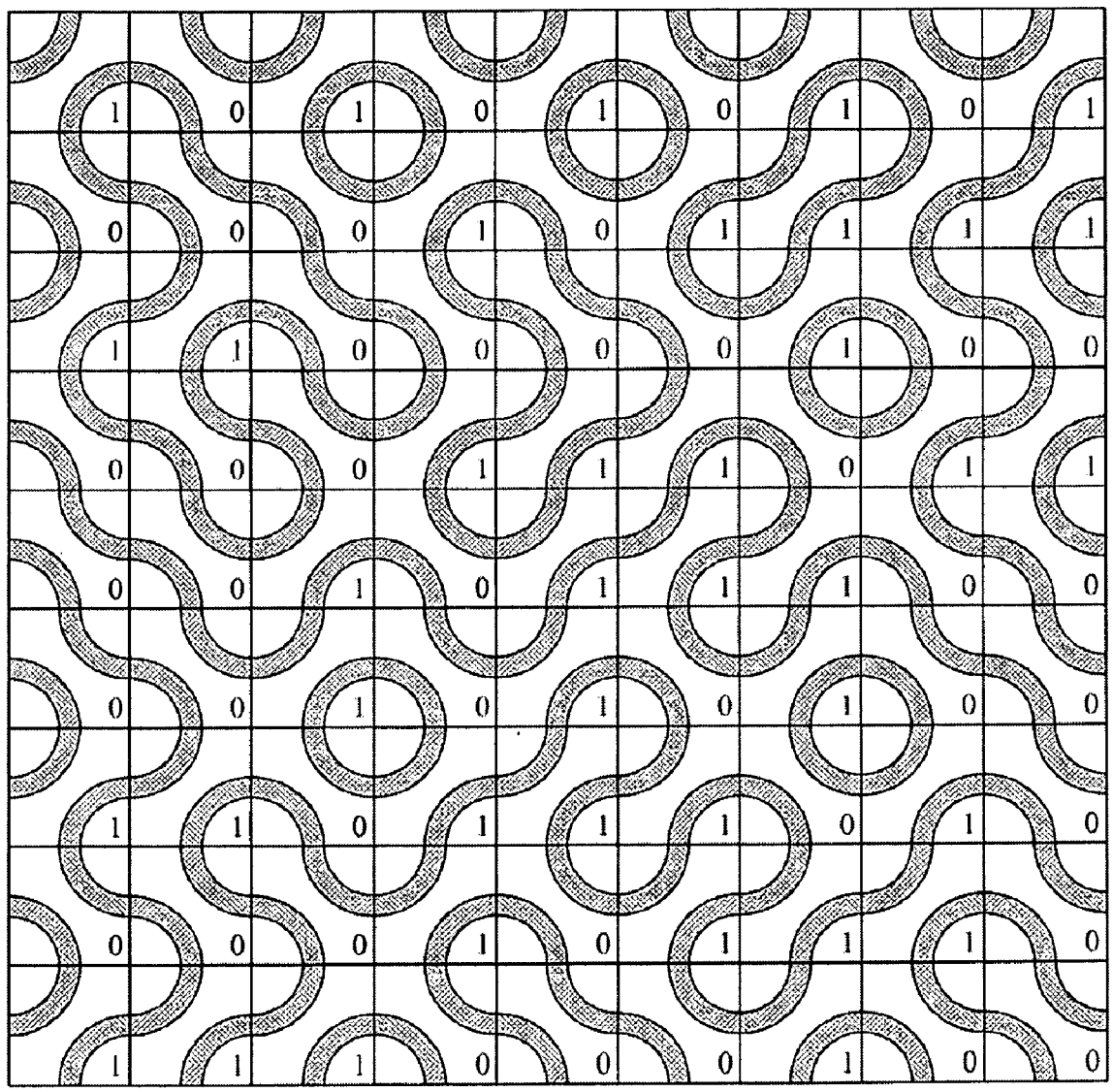
FIG. 3 illustrates a sample of serpentine halftone patterns with a single halftone level and binary data components.
Figure 4:
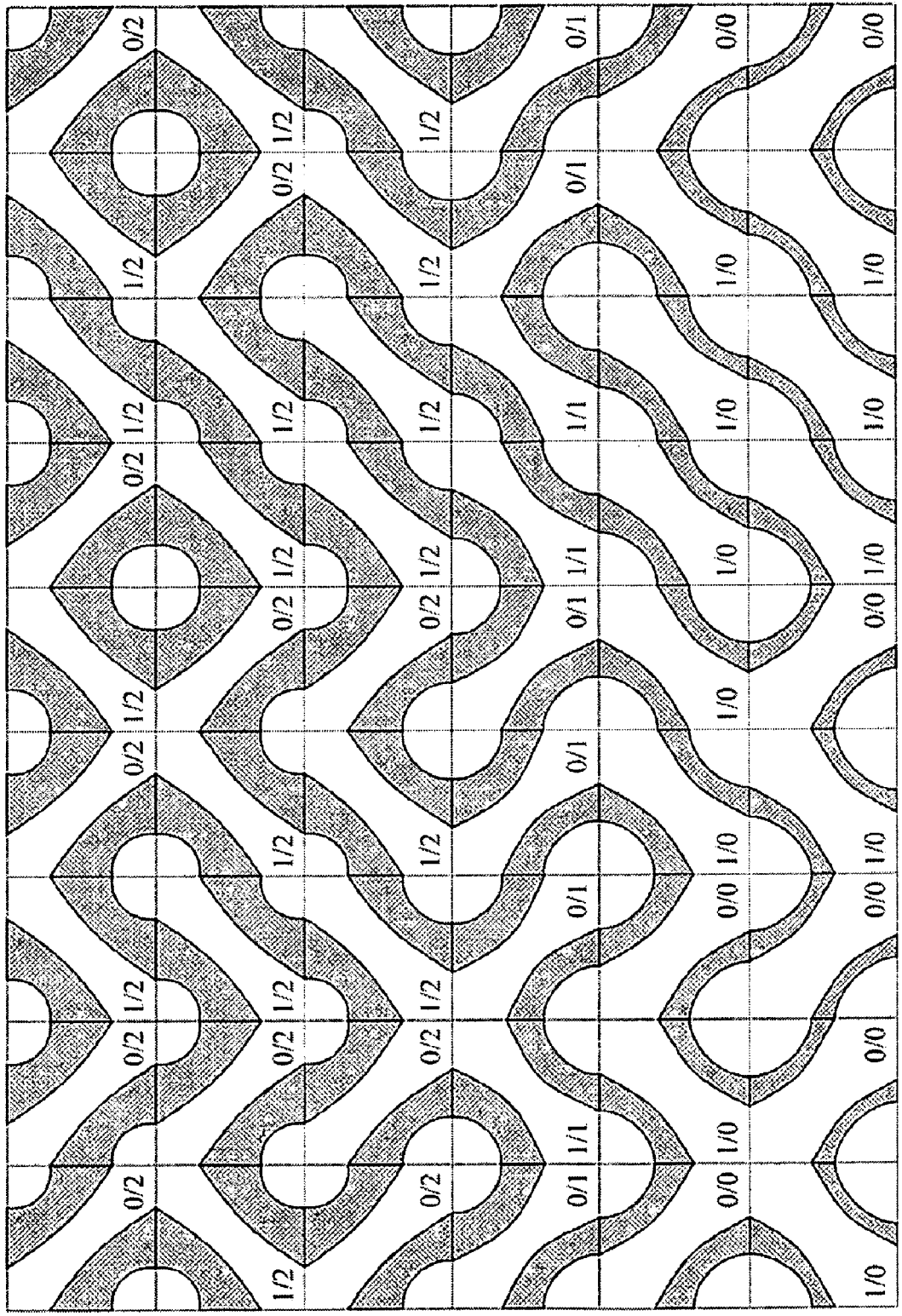
FIG. 4 illustrates a sample of serpentine halftone patterns with binary data components and multiple halftone components (i.e., binary data level/halftone level)

FIG. 3 illustrates an enlarged view of a halftone image in which a single tone is used to encode data (e.g., authentication token 122). The digital value of each cell is indicated in the lower right corner. As illustrated in FIG. 3, since each of the halftone cells is identical at their boundary even though they may be rotated at ninety degrees from each other, there exits no discernable change in tone. FIG. 4 illustrates a further example of an enlarged view of a halftone image in which three different tones are used to encode data. In each of the halftone cells illustrated in FIG. 4 the data value is indicated followed by the tone value (e.g., 0/2). Further details of forming serpentine halftone images are disclosed in U.S. Pat. No. 5,706,099 ('099), issued Jan. 6, 1998, to Curry, which is incorporated herein by reference.

In an alternate representation of embedded data, hyperbolic serpentine halftone cells are used to encode the authentication token 122 instead of circular serpentine halftone cells, examples of which are illustrated in FIG. 2. Further details of hyperbolic serpentine halftone cells are set forth in U.S. Pat. No. 6,081,345, issued on Jun. 27, 2000, to Curry, which is incorporated herein by reference. In yet another representation of embedded data, halftone glyphs are used to encode authentication token 122. Further details of halftone glyphs are disclosed in U.S. Pat. No. 5,315,098, issued May 24, 1994, to Tow.

Because the serpentine halftone patterns illustrated in FIGS. 2-4 can be used to encode information at approximately 100 bits/inch or higher, they can be used to integrate the grayscale image data 108 with the authentication token 122. Advantageously, the present invention uses highly compressed grayscale image data to generate the authentication token 122. As a result, the signature generation system 100 in combination with the signature verification system 500 provide means for authenticating a hardcopy document using digital authentication techniques even though the digital representation of the scanned hardcopy document may vary between sender and recipient.

Signature Verification

FIG. 5 illustrates two different methods for verifying the authenticity of the signed hardcopy document 128 using the signature verification system 500. Initially, grayscale image data 502 of the signed hardcopy document 128 is generated using a scanner 106. The grayscale image data 502 is input to decoding module 504 that decodes the encoded halftone image data 125 produced by the signature generation system 100. The output of the decoding module 504 is the authentication token 122 produced by the authentication token generator 114. As set forth above, the authentication token 122 represents the digital signature of the sender and a compressed representation of the signed hardcopy document 128.

Once the grayscale image data 502 of the signed hardcopy document is decoded, the authentication module 508 is used to authenticate the authentication token 122. More specifically, the authentication module 508, which takes as input the authentication token 122 and a public key 516, authenticates the digital signature (i.e., authentication token 122) to authenticate the compressed image data 112 that is embedded in the authentication token 122. In one embodiment, the public key 516 is retrieved from the public-private key authority using the name of the person who sent the signed hardcopy document 128. In an alternative embodiment, the public key 516 is obtained from the public-private key authority using a hint that is encoded in the grayscale image data 502 along with the authentication token 122.

In one embodiment, when the authentication token 122 is composed of the compressed image data and an encrypted hash of the compressed image data, then the authentication token is authenticated by decrypting the encrypted hash of the compressed image data. In an alternate embodiment, when the authentication token 122 is composed of encrypted compressed image data, then the authentication token is authenticated by decrypting the encrypted compressed image data. After being authenticated (and decrypted if necessary), the compressed image data 112 is then decompressed by the decompression module 512 to produce decompressed image data 514. In the event the decompressed image data 514 is compressed using a lossy compression scheme, the decompressed image data 514 is a lossy representation of the grayscale image data 108 before it was compressed by compression module 110.

Final verification of the signed hardcopy document 128 is then performed using both or a single of the following first and second verification steps. The first verification step is performed by first printing an authenticated hardcopy of the original document 528 with printer 126 using the decompressed image data 514. Once printed, the authenticated hardcopy of the original document 528 is compared visually against the signed hardcopy document 128 at 530. In an alternate embodiment, the decompressed image data 514 is rendered for output on display 532 for visual comparison with the signed hardcopy document 128. In yet another embodiment, rendered versions for display of the decompressed image data 514 and the grayscale image data 502 are displayed side-by-side or overlaid on top of each other for visual comparison on the display 532.

The second verification step is performed by image data comparison module 518 that compares the decompressed image data 514 with the grayscale image data 502. One method for comparing these two images is to compare identified features in the image data 514 and 502. If the identified features match within a predefined degree of certainty then the image data 514 and 502 is specified by the image data comparison module 518 to match. If the image data comparison module 518 has identified a match, the authenticity of the signed hardcopy document 128 is indicated to the recipient to be valid (i.e., a match) or invalid (i.e., no match) by indicators 520 and 522, respectively. Methods for identifying features in images is known in the art as disclosed by Bhattacharjee et al., in "Compression Tolerant Image Authentication," Proceedings of the 5th IEEE International Conference on Image Processing (ICIP'98), Chicago, Vol. 1, Oct. 4-7, 1998, and by Lin et al., in "A Robust Image Authentication Method Distinguishing JPEG Compression from Malicious Manipulation," CU/CTR Technical Report 486-97-19, December 1997 (available on the Internet at http://www.ctr.columbia.edu/~cylin/pub/authpaper.ps), which are incorporated herein by reference.

The advantage of visually comparing the signed hardcopy document 128 and the authenticated hardcopy of the original document 528 is that those portions of the signed hardcopy document that are most important to the recipient of the document can be specifically identified and verified. It will be appreciated by those skilled in the art that specific annotations could be used to identify areas of interest on the signed hardcopy document and used to evaluate whether the signed hardcopy document 128 is authentic.

Signature Generation for Documents Having Textual Content

FIG. 6 illustrates an alternate embodiment for generating a signed hardcopy document of an original document composed of binary or bi-level data (e.g., textual content) instead of grayscale image data (i.e., multiple gray or color levels). Similar to the embodiment shown in FIG. 1, an original hardcopy document 602 is scanned at scanner 106 to record a bitmap image. However, unlike the bitmap image recorded in FIG. 1, the bitmap image recorded in the embodiment illustrated in FIG. 6 is binary image data 604. The compression module 605, similar to the compression nodule 110, is adapted to produce a compressed form (i.e., compressed image data 112) of the binary image data 604. The compression ratio that can be achieved varies depending on the particular compression scheme used to compress the binary data 604.

In one embodiment, the compression scheme used to compress the binary data 604 is a low-fidelity version of a symbol based compression scheme disclosed in U.S. Pat. No. 5,835,638 ('638), issued Nov. 10, 1998, to Rucklidge et al., which is hereby incorporated by reference. The low-fidelity symbol based compression scheme achieves a higher compression ratio than the symbol based compression scheme disclosed in '638 by reducing the quality of document appearance (i.e., formatting) while preserving the quality of document content in a compressed image. As set forth in '638, a document is compressed using symbol based compression by identifying tokens (i.e., small image segments) that are identical or nearly identical (e.g., two instances of the letter "e" in the same font having the same font size) with a single exemplar and recording locations where the exemplar appears in the original document.

Low-fidelity symbol based compression of a document is performed by eliminating compression information directed at preserving document formatting. That is improved levels of compression can be achieved by reducing the effective resolution of an image by either directly or indirectly reducing the resolution of exemplars and exemplar locations.

More specifically, improved levels of compression can be achieved using low-fidelity symbol based compression by directly reducing the resolution of exemplars recorded in a compressed image. For example, in black and white documents, a 300 dpi (dot per inch) exemplar can be replaced by a 75 dpi two-bit grayscale exemplar. In an alternate embodiment, the resolution of exemplars can be indirectly reduced by recording an imprecise outline of an exemplar. Because the outline of an exemplar is imprecise, the resolution of the exemplar is indirectly reduced since the actual symbol cannot always be accurately reproduced.

Also, improved levels of compression can be achieved by recording at reduced resolutions the locations of the instances at which each token appears in an original image. For example, exemplar locations can be recorded to be within +/−1/75 of an inch rather than 1/300 of an inch. In an alternate embodiment, the amount of data for recording the position of exemplars can also be reduced by indirectly reducing the resolution of exemplar positions. In this alternate embodiment, exemplars on a line are ordered but no indication of the position is recorded in the compressed image. In this alternate embodiment, the effective resolution of exemplar positions is indirectly reduced because the effective spacing between symbols on a line is estimated when an image is decompressed.

In addition, improved levels of compression can be achieved by identifying and eliminating exemplars that have little or no document content or that primarily affect document formatting. That is, improved levels of compression can be achieved by eliminating non-essential elements of document content and document formatting. For example, the dot over an "i" and ruled lines used to separate table cells can be omitted without any subsequent loss in document content in a decompressed image.

It will be appreciated by those skilled in the art that as long as the order of the characters and other gross spacing properties of the binary image data 604 are preserved, the compressed image data 112 will contain sufficient content for verifying the authenticity of the original hardcopy document 602. In an alternate embodiment, the compression module 605 uses the JBIG2 encoding standard (details are available on the Internet at http://www.jpeg.org/public/jbigpt2.htm) to compress bi-level image data.

Similar to the embodiment shown in FIG. 1, the compressed image data 112 is input to authentication token generator 114 along with private key 116 to produce authentication token 122 (i.e., digital signature). However, unlike the embodiment shown in FIG. 1, the embodiment shown in FIG. 6 provides different variations for integrating the digitally signed compressed image data (i.e., authentication token 122) with the binary image data 604. A first variation is to print the authentication token using data glyphs on an additional document page(s) 610 using a printer 126. The data glyphs printed on the additional document page 610 form what is defined herein as notary stamp 612. In an alternate embodiment, the notary stamp 612 is encoded using a serpentine halftone pattern discussed above and disclosed in '099. In yet another embodiment, the notary stamp 612 is printed on an adhesive label that is fixedly attached to the original hardcopy document 602, or a reproduction thereof, to produce a signed hardcopy document.

In a second variation, the authentication token represented as the notary stamp 612 is merged with the binary data 604 onto signed hardcopy document 614. In this second variation, a merge module 606 generates merged image data by shrinking (e.g., region 616) if necessary the binary image data 604 to fit with notary stamp 612 onto the signed hardcopy document 614. In a third variation, the authentication token 122 is a low intensity background pattern 618 that is merged with binary data 604 to define signed hardcopy document 620. In one embodiment, the low intensity background pattern is a serpentine halftone pattern discussed above and disclosed in '099.

Data glyphs referred to herein encode digital information in the form of binary ones and zeros that are then rendered in the form of very small linear marks. Generally, each small mark represents a digit of binary data. Whether the particular digit is a binary one or zero depends on the linear orientation of the particular mark. For example, in one embodiment, marks oriented from top left to bottom right may represent a zero, while marks oriented from bottom left to top right may represent a one. The individual marks of the data glyphs, which form the notary stamp 612, are of such a size relative to the maximum resolution of a printing device as to produce an overall visual affect to a casual observer of a uniform gray halftone area when a large number of such marks are printed together on paper. U.S. Pat. Nos. 5,091,966; 5,128,525; 5,168,147; 5,221,833; 5,245,165; 5,315,098; 5,449,895; and 5,486,686, which are hereby incorporated by reference, provide additional information about the uses, encoding and decoding techniques of data glyphs.

It will be appreciated by those skilled in the art that in the event the original hardcopy document 602 is gray, the authentication system can be defined such that the digital signature for a gray image is generated using notary stamp 612 as illustrated in the signed hardcopy documents 610 and 614. This alternate embodiment would be appropriately used for example when the printer 126 used to generate a signed hardcopy document is not capable of generating serpentine halftone patterns.

Enhanced Image Compression

Figure 7:
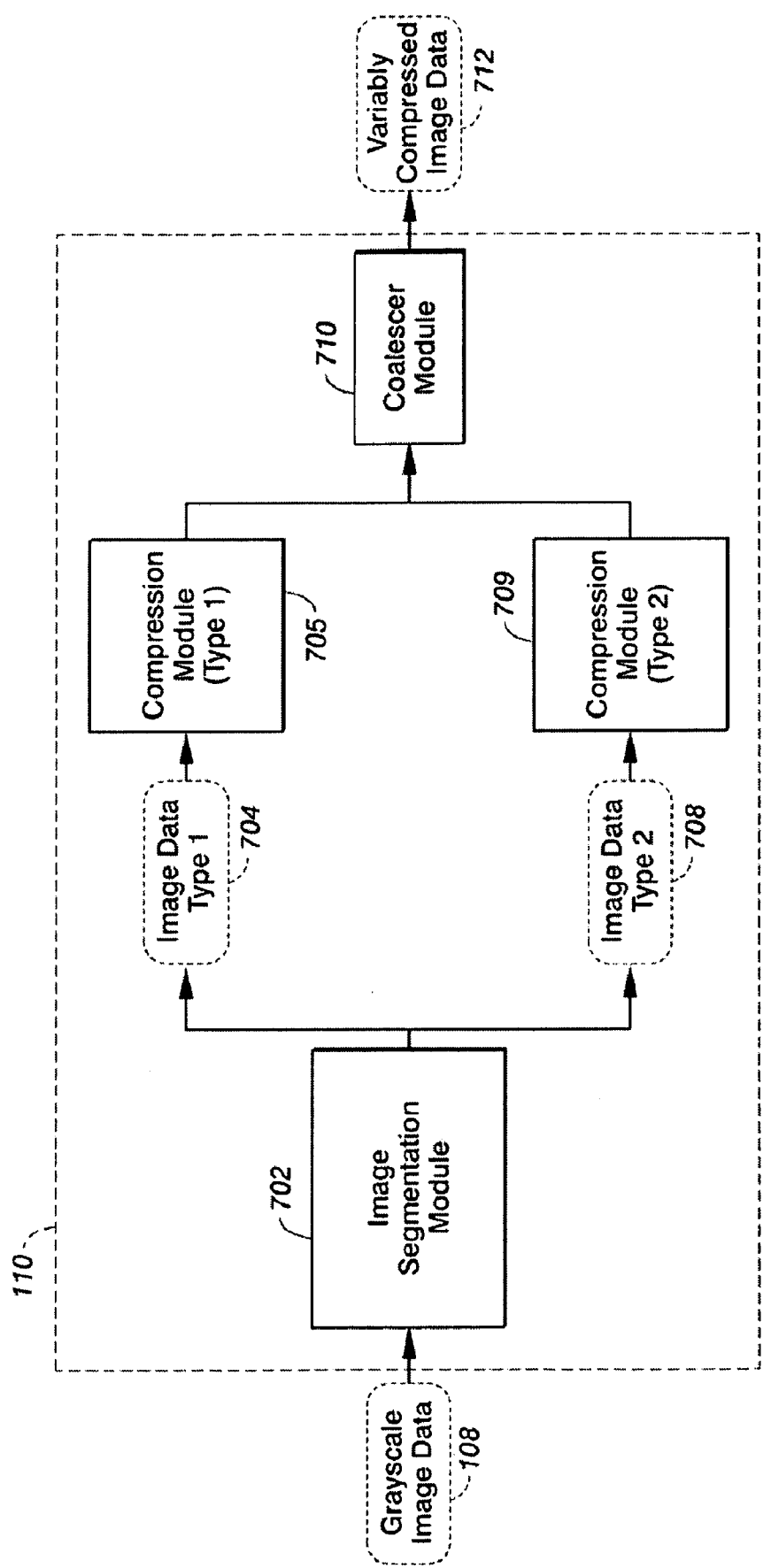
FIGS. 7 and 8 illustrate alternate embodiments for the compression module shown in FIGS. 1 and 6.

FIG. 7 illustrates an alternate embodiment for the compression module shown in FIGS. 1 and 6. The purpose of this alternate embodiment is to identify those areas of an image that can be more highly compressed than other areas. The image compression module 110 segments a bitmap image 108 using a segmentation module 702. The segmentation module operates known image segmentation techniques such as those disclosed in U.S. Pat. No. 5,293,430, issued Mar. 8, 1994, to Shiau et al. The image segmentation module 702 identifies two or more image data types (e.g., image data type one 704 and image data type two 708). Depending on the nature of the data, each of the identified data types are then compressed with different compression algorithms (e.g., compression module 705 and compression module 709). For example, binary text identified as data type 704 is compressed by module 705 which compresses data using symbol based compression, and photographs identified as data type 708 is compressed by module 709 which compresses data using JPEG or wavelets. Once compressed at different levels, these segmented portions are coalesced by module 710 into variably compressed image data 712. The advantage of the compression module illustrated in FIG. 7 is that it accounts for original hardcopy documents that combine multiple types of image data (e.g., image data, graphics, text).

Enhanced Authentication

Figure 8:
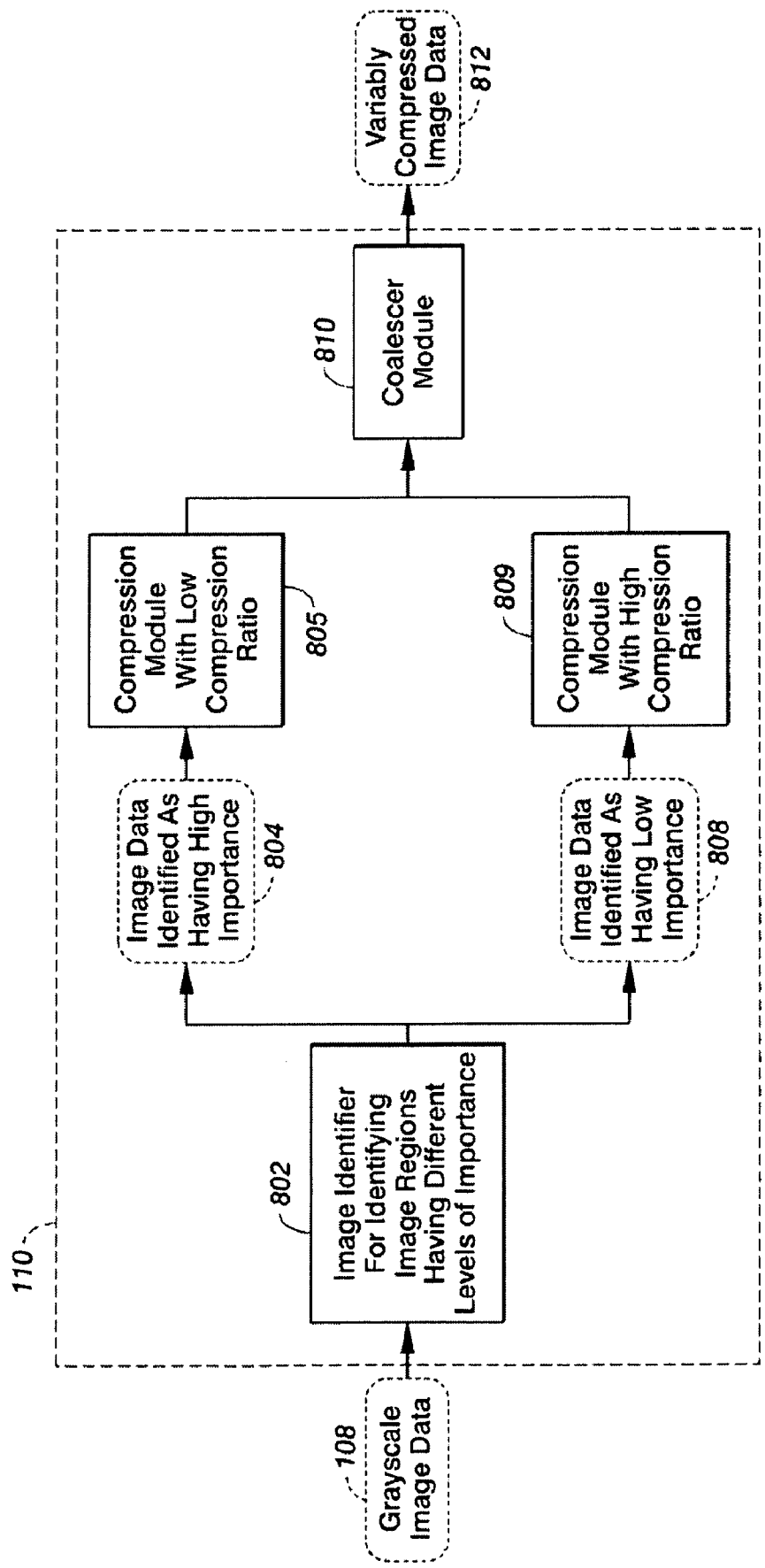

FIG. 8 illustrates yet another alternate embodiment of the compression module 110. In this alternate embodiment, image segmentation performed by image identifier 802 is based on the importance of image content and not on the type of image content as set forth in the embodiment shown in FIG. 7. The determination of whether image content (i.e., image data) is important and performed automatically by identifier 802 or by hand by a user. For example, faces in a pictorial image are likely to be considered important, whereas the background pattern behind the faces is likely to be considered less important. When a region is identified to be important (e.g., image data 804), compression schemes with low compression ratios (e.g., compression module 805) are used to achieve higher fidelity. In contrast, image regions identified as being less important (e.g., image data 808) are compressed using compression schemes with high compression ratios (e.g., compression module 809). It will be appreciated by those skilled in the art that different compression schemes may not be required for the compression modules 805 and 809 and that different compression ratios are achieved by a single compression scheme that compress image data at multiple compression levels. Once compressed, the two (or more) levels of compressed data are coalesced by module 810 to produce variably compressed data 812.

In a variant of this embodiment, a sender interested in generating a signed hardcopy document manually highlights or annotates important and less important regions at a computer. The user could then be shown what the compressed image data looks like when reproduced by the recipient. The user could then either accept it, or decide that important parts are still not clear, and perform another iteration of selecting regions for higher or lower fidelity encoding.

SUMMARY

To recapitulate, the authentication system includes a signature generation system and a signature verification system. The signature generation system performs the steps of: scanning an original hardcopy document to reduce it to a bitmap (e.g., color or grayscale); compressing the bitmap image using compression schemes that achieve high compression ratios; signing the resulting bits; and printing a signed hardcopy document by encoding the signed bits using a serpentine halftone pattern (e.g., circular or hyperbolic) defining the bitmap image of the scanned original hardcopy document.

The authenticity of the signed hardcopy document is verified using the signature verification system by performing the steps of: recording (i.e., reducing to a digital form with a scanner) a bitmap of the signed hardcopy document; decoding the data recorded in the serpentine halftone patterns of the signed hardcopy document; authenticating the decoded data (i.e., the authentication token); decompressing the authenticated decoded data (i.e., decompressed image data); and comparing the signed hardcopy document with lower fidelity printed decompressed image data to verify that they match. Advantageously, this authentication system provides a system for authenticating hardcopy documents even though slightly different bits are obtained each time a hardcopy document is scanned. A further advantage of the system is that it does not require any document specific information be stored online (except for the public key of the sender), thereby providing self-authenticating hardcopy documents.

It will be appreciated by those skilled in the art that the use of the term document herein and illustrated in the figures is not limited to a single page but that it may refer to a collection of one or more pages. In one embodiment when a document is composed of multiple pages, each page is signed and verified separately. In an alternate embodiment when a multi-page document is identified, the signature generation system 100 explicitly encodes in the authentication token 122 a Multi-page identifier (e.g., k of n pages) of each page of the document, if one exists.

It will also be appreciated by those skilled in the art that the quality of the compressed image that is subsequently compared with the original scanned in image will vary depending on the lossiness of the compression scheme used. If sufficient encoding space is available in the signed hardcopy document, a lossless compression scheme is used to compress the scanned hardcopy document. However, in the event lossless compression is not possible due to the limitation of the amount of data that can be encoded in a halftone or a notary stamp on a signed hardcopy document, lossy compression schemes are used in their place. In addition, it will be appreciated by those skilled in the art that there exits variations of digital authentication. For example, there exists private-private key authentication (e.g., based on the Diffie-Hellman Algorithm).

It will further be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A system for generating a signed hardcopy document and authentication thereof, comprising:
    a data representation module configured to record a data representation comprising digital data from a hardcopy document;
    a compression module configured to compress the digital data using a compression scheme comprising one of low-fidelity compression and symbol-based compression;
    an authentication token generator configured to generate an authentication token from the compressed digital data;
    an encoding module configured to encode the authentication token; and
    a presentation module configured to print a signed hardcopy document comprising both the encoded authentication token and the data representation.

2. A system according to claim 1, further comprising:
    memory configured to record a data representation of the signed hardcopy document;
    a decoding module configured to decode the encoded authentication token from the data representation of the signed hardcopy document;
    a data authentication module configured to authenticate the compressed digital data from the decoded authentication token;
    a decompression module configured to decompress the compressed digital data; and a comparison module configured to compare the decompressed digital data with the signed hardcopy document.

3. A system according to claim 2, further comprising:
a document generator configured to print the decompressed digital data as an authenticated hardcopy document.

4. A system according to claim 2, further comprising:
a feature comparison module configured to compare identified features in the decompressed digital data and the data representation of the signed hardcopy document; and
a verification module configured to determine that the signed hardcopy document is valid when the identified features of the decompressed digital data and the data representation of the signed hardcopy document match within a predefined degree of certainty.

5. A system according to claim 1, wherein the digital data of the data representation comprises one of grayscale data and binary data.

6. A system according to claim 1, wherein the authentication token is generated by at least one of encrypting the compressed digital data and encrypting a hash of the compressed digital data.

7. A system according to claim 1, wherein the authentication token is encoded in a background of the signed hardcopy document.

8. A system according to claim 1, further comprising:
a modification module configured to alter a size of the data representation of the hardcopy document; and
a merge module configured to merge the encoded authentication token with the altered data representation of the hardcopy document.

9. A system according to claim 1, further comprising:
a data identification module configured to identify a plurality of data segments in the data representation of the hardcopy document;
a data determination module configured to determine at least one of a type and an importance of each data segment; and
a data compression module configured to compress each data segment using a different compression scheme based on the at least one type and importance determined for that data segment.

10. A method for generating a signed hardcopy document and authentication thereof, comprising:
recording a data representation comprising digital data from a hardcopy document;
compressing the digital data using a compression scheme comprising one of low-fidelity compression and symbol-based compression;
generating an authentication token from the compressed digital data and encoding the authentication token; and
printing a signed hardcopy document comprising both the encoded authentication token and the data representation.

11. A method according to claim 10, further comprising:
recording a data representation of the signed hardcopy document;
decoding the encoded authentication token from the data representation of the signed hardcopy document;
authenticating the compressed digital data from the decoded authentication token and decompressing the compressed digital data; and
comparing the decompressed digital data with the signed hardcopy document.

12. A method according to claim 11, further comprising:
printing the decompressed digital data as an authenticated hardcopy document.

13. A method according to claim 11, further comprising:
comparing identified features in the decompressed digital data and the data representation of the signed hardcopy document; and
determining that the signed hardcopy document is valid when the identified features of the decompressed digital data and the data representation of the signed hardcopy document match within a predefined degree of certainty.

14. A method according to claim 10, wherein the digital data of the data representation comprises one of grayscale data and binary data.

15. A method according to claim 10, wherein the authentication token is generated by at least one of encrypting the compressed digital data and encrypting a hash of the compressed digital data.

16. A method according to claim 10, wherein the authentication token is encoded in a background of the signed hardcopy document.

17. A method according to claim 10, further comprising:
altering a size of the data representation of the hardcopy document; and
merging the encoded authentication token with the altered data representation of the hardcopy document.

18. A method according to claim 10, further comprising:
identifying a plurality of data segments in the data representation of the hardcopy document;
determining at least one of a type and an importance of each data segment; and
compressing each data segment using a different compression scheme based on the at least one type and importance determined for that data segment.

19. A system for generating a notary stamp and authentication thereof, comprising:
a data representation module configured to record a data representation comprising digital data from a hardcopy document;
a compression module configured to compress the digital data using a compression scheme including one of low-fidelity compression and symbol-based compression;
an authentication token generator configured to generate an authentication token from the compressed digital data;
an encoding module configured to encode the authentication token;
a notary stamp generator configured to render the encoded authentication token as a notary stamp; and
a presentation module configured to print the notary stamp on an adhesive label attachable to the hardcopy document as a signed hardcopy document.

20. A system according to claim 19, further comprising:
memory configured to record a data representation of the signed hardcopy document;
a decoding module configured to decode the encoded authentication token of the notary stamp from the data representation of the signed hardcopy document;
a data authentication module configured to authenticate the compressed digital data from the decoded authentication token;
a decompression module configured to decompress the compressed digital data; and
a comparison module configured to compare the decompressed digital data with the signed hardcopy document.

21. A method for generating a notary stamp and authentication thereof, comprising:
   recording a data representation comprising digital data from a hardcopy document;
   compressing the digital data using a compression scheme including one of low-fidelity compression and symbol-based compression;
   generating an authentication token from the compressed digital data and encoding the authentication token;
   rendering the encoded authentication token as a notary stamp; and
   printing the notary stamp on an adhesive label attachable to the hardcopy document as a signed hardcopy document.

22. A method according to claim 21, further comprising:
   recording a data representation of the signed hardcopy document;
   decoding the encoded authentication token of the notary stamp from the data representation of the signed hardcopy document;
   authenticating the compressed digital data from the decoded authentication token and decompressing the compressed digital data; and
   comparing the decompressed digital data with the signed hardcopy document.

* * * * *